Patented Sept. 6, 1932

1,875,401

UNITED STATES PATENT OFFICE

JOHN C. WOODRUFF AND PERRY W. WILSON, OF TERRE HAUTE, INDIANA, ASSIGNORS TO COMMERCIAL SOLVENTS CORPORATION, OF TERRE HAUTE, INDIANA, A CORPORATION OF MARYLAND

PROPIONIC ACID FERMENTATION

No Drawing.      Application filed August 2, 1928.   Serial No. 297,094.

Our invention relates to a method of obtaining propionic acid by fermentation. More specifically, our invention relates to a process for the production of propionic acid whereby the length of time usually required in the fermentation process is greatly shortened, and at the same time substantially all of the raw carbohydrate material is recovered in the form of useful products.

It has been the custom in the past to prepare propionic acid by the fermentation of solutions of crude or pure lactose or other carbohydrate or mixture of carbohydrates; lactates or other fermentable organic salts. Of these materials, crude lactose obtained from whey has been generally regarded as the most suitable and practical raw material. Other sugars such as galactose, glucose, sucrose and maltose have been suggested as satisfactory raw materials when obtainable in suitable form at a low enough price. In a co-pending application, U. S. Serial No. 297,093 filed August 2, 1928, there is described a new and practical method of using, as raw materials for the production of propionic acid, saccharine carbohydrates which are deficient in or free from protein matter such as glucose, dextrose, molasses, corn syrup, "Hydrol", "wood juice", hydrolyzed maize solutions, hydrolyzed starch solutions and malted grain solutions.

Hydrol is the name given to the product obtained in the production of glucose by the acid hydrolysis of starch. It has the following approximate composition:

|  | Per cent |
|---|---|
| Dextrose | 55 |
| Dextrine | 18 |
| Water | 27 |

"Wood juice" is a term used to designate the solution of mixed sugars obtained by the hydrolysis of wood. These sugars consist of pentoses, hexoses, hexose polymers, and undetermined carbohydrate substances.

Like all protoplasmic bodies, bacteria consist of carbon, oxygen, and nitrogen, to which are added inorganic salts and varying quantities of phosphorus and sulphur. In order that bacteria may develop and multiply, therefore, they must be supplied with all of these substances in proper quantities and in forms suitable for assimilation. The first three materials named are present in the carbohydrate used as the raw material and the other required constituents are usually present in sufficient quantities for the requirements of the bacteria along with the carbohydrate when the latter is taken in other than the pure or refined form. When the highly essential nitrogen is absent from the raw material used in preparing the media for the bacteria, it is necessary to supply it in some other form. In a copending application, U. S. Serial No. 297,093, filed August 2, 1929, we have described the use of distillery wastes such as yeast water and the "slop" or distillation residue obtained in the butyl-acetonic fermentation industry, as nutrient materials in the production of propionic acid by fermentation.

A number of microorganisms have been recommended as propionic acid producers but the most suitable of these appears to be bacterium acidi propionici, an organism isolated from Swiss cheese. Organisms of this type act very slowly and unless very large amounts of inoculum or other means are taken to hasten the completion of the fermentation, the latter as a rule takes fairly long periods of time, ten days or longer. Due to this fact, it has been the custom in the past to employ with the propionic acid culture an "accelerator" organism which speeds up the fermentation and allows its completion in much shorter intervals. Lactobacillus casei and Proteus vulgaris are examples of this type of organism. Even with the aid of large amounts of inoculum and "accelerator" organisms, however, it usually is not possible under practical operating conditions to obtain the complete conversion of all of the carbohydrate material into propionic acid and other products formed during the fermentation much under ten days time. This long period of time required to complete a fermentation materially increases the plant installation necessary and consequently raises appreciably the final cost of the desired products.

We have now made the discovery that the greater portion of the raw materials is fermented by the propionic acid bacteria during the first few days of the fermentation period and that an equal or greater length of time is consumed in the fermentation of the remaining small portion of the raw material. For example, we have found that when fermenting a solution of hydrolyzed starch, the first eighty per cent of the raw material will be consumed in the first four to five days, the remaining twenty per cent requiring three to five days for its consumption. Under ordinary conditions it would appear desirable to stop the operation at the end of the fourth or fifth day and recover the products formed up to that time were it not for the fact that in this process, as in most fermentation processes, the raw material cost is one of the most important items.

According to our new and improved process we obtain the advantages of a quick propionic acid fermentation and at the same time effect a useful recovery of the residual raw material remaining in the mash after the first rapid period of propionic acid formation has ceased. Our new process may best be understood by means of the following examples. A five per cent corn starch suspension is hydrolyzed by heating for approximately one hour at 15-20 lbs. pressure with approximately 1% hydrochloric acid. The sugar solution thus obtained is neutralized to pH 6.0-7.0 with sodium hydroxide or other suitable alkaline media. The mixture is then sterilized for one hour at 15 lbs. steam pressure and run thru coolers into the fermentation vats, where it is inoculated. The inoculum preferably consists of 5% of a propionic acid culture and 0.05% of a lactic acid culture ("accelerator" organism) or 5% of a culture consisting only of propionic acid organisms. In carrying out industrial scale operations in 50,000 gallon fermenters, it is preferred to place 10,000 gallons of mash into each of a series of fermenters, inoculate, and then make subsequent additions of mash consisting of about 10,000 gallons each, as prepared, until the desired amount has been placed in each fermenter. When proper precautions are taken to avoid contamination of the freshly hydrolyzed starch and a vigorous culture of the propionic acid organism is employed, the sterilization step may be omitted, if found desirable. However, as a measure of safety, it is usually advisable to sterilize.

It has been found that, in general, organisms which produce acids during the course of a fermentation become less and less active as the concentration of acid in the media increases. After a certain point is reached, the action of the bacteria becomes negligible unless the acid is removed from the media. Such a condition is met with in propionic acid fermentation. In order to prevent the media from becoming too acid, sufficient powdered calcium carbonate, or other suitable insoluble alkaline earth compound is added to the media at the beginning of the fermentation to neutralize all of the acids formed during the course of the fermentation. Or, if preferred, smaller additions may be made each day instead of all at one time. In either case, thorough agitation should be resorted to at frequent intervals. If desired, the acids may be neutralized by means of alkaline materials such as sodium hydroxide or sodium carbonate solutions in place of calcium carbonate. In this case, however, it is necessary to add the neutralizing agent at more frequent intervals in order to prevent making the media too alkaline, it being highly desirable to control the acidity of the media so that the hydrogen ion concentration is maintained preferably within the limits $10^{-7}$ and $10^{-5}$ measured within the bulk of the mash.

A fermentation carried out under the above-specified conditions at a temperature of approximately 37° C., when using a 5% sugar solution, is ordinarily completed in from 7 to 10 days time. The greater portion of the sugar—usually, approximately 80%—is consumed by the bacteria during the first 4 or 5 days of the fermentation period. The action of the bacteria then seems to slow up and an equal or greater length of time is required for the conversion of the remaining small portion of sugar. By our new and improved process, we are able to complete the operation in a fraction of the time formerly required and at the same time recover the residual sugar remaining in the media after the first vigorous period of propionic acid fermentation has passed. We may accomplish this end in various ways but we prefer to proceed as follows. As soon as it is noted that the greater portion of the sugar has been consumed by the propionic acid bacteria and the rate of fermentation has slackened, steam under pressure is passed into the fermenting media a sufficient length of time to destroy at least the greater portion of the propionic acid bacteria. When this end has been accomplished the media is cooled by any convenient means to approximately 30° C. and inoculated with a vigorous culture of yeast. In this manner the remaining sugar in the media may be quickly and efficiently converted into ethyl alcohol, with or without aëration, according to methods well known in the art. We prefer, however, to employ aeration, since under such conditions weak sugar solutions are completely fermented in ten to thirty hours, as compared to seventy-two to one hundred and twenty hours required to complete the propionic acid fermentation of the same residual sugar.

When a vigorous yeast culture is employed it is not always necessary to destroy the propionic acid bacteria before inoculating with the yeast culture, altho we prefer to follow this method of procedure. By means of our new process we may inoculate a medium containing an attenuated or weak culture of propionic acid bacteria with a vigorous culture of yeast with the result that the latter will quickly gain the ascendency and the process becomes practically an ethyl alcohol fermentation. Our new process therefore permits the useful recovery of the greater portion of the raw material employed and at the same time assists in the rapid completion of slow fermenters, thus facilitating regular plant operation.

After the completion of the fermentation, the ethyl alcohol may be removed by distillation and the salts of the various acids formed during the propionic acid fermentation recovered and treated with sulphuric acid in order to obtain the desired acids.

During the course of the propionic acid fermentation, often approximately 25% of the sugar consumed is converted into lactic acid. The remainder of the sugar is converted into propionic acid and acetic acid in proportions ranging from 1½ of the former to 1 of the latter, to 2 of the former to 1 of the latter.

We have described above only the use of a hydrolyzed starch solution as a suitable raw material for use in our new and improved process. It is distinctly understood, however, that we do not confine ourselves to the use of this raw material alone, but may employ generally any other carbohydrate material which is suitable for propionic acid fermentation. Neither do we confine ourselves to the use of any particular type of propionic acid forming organism nor to any particular type of yeast; any organisms ordinarily used for these purposes may be employed in our new process.

Now having described our invention what we claim as new and novel is:

1. A process for producing propionic acid and ethyl alcohol by fermentation of carbohydrate material which comprises inoculating a carbohydrate-containing mash with propionic acid bacteria, allowing the propionic acid fermentation to proceed until the peak of the fermentation has passed, and then inoculating with yeast and allowing fermentation to proceed to completion.

2. A process for producing propionic acid and ethyl alcohol by fermentation of carbohydrate material which comprises inoculating a carbohydrate-containing mash with propionic acid bacteria, allowing the propionic acid fermentation to proceed until the peak of the fermentation has passed, and then partially sterilizing the mash, inoculating the partially sterilized mash with yeast and allowing fermentation to proceed to completion.

3. A process for producing propionic acid and ethyl alcohol by fermentation of carbohydrate material which comprises inoculating a carbohydrate-containing mash with propionic acid bacteria, allowing the propionic acid fermentation to proceed until the peak of the fermentation has passed, and then sterilizing the mash, inoculating the sterilized mash with yeast and allowing fermentation to proceed to completion.

In testimony whereof we affix our signatures.

JOHN C. WOODRUFF.
PERRY W. WILSON.